US007185079B1

(12) United States Patent
Bainbridge et al.

(10) Patent No.: US 7,185,079 B1
(45) Date of Patent: Feb. 27, 2007

(54) AUTOMATED MANAGEMENT OF NETWORK ADDRESSES IN A BROADBAND MANAGED ACCESS ENVIRONMENT

(75) Inventors: David K. Bainbridge, Acton, MA (US); Adam L. Taylor, Acton, MA (US); Shannon I. Hembrough, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 853 days.

(21) Appl. No.: 09/925,227

(22) Filed: Aug. 8, 2001

(51) Int. Cl.
    *G06F 15/177* (2006.01)
(52) U.S. Cl. .................. 709/223; 709/224; 709/225; 709/226
(58) Field of Classification Search ........ 709/220–226, 709/242, 203, 208, 201
    See application file for complete search history.

(56) References Cited

U.S. PATENT DOCUMENTS

| 5,708,654 | A | 1/1998 | Arndt et al. ............... 370/242 |
| 5,724,510 | A | 3/1998 | Arndt et al. ............. 395/200.5 |
| 5,790,548 | A | 8/1998 | Sistanizadeh et al. ....... 370/401 |
| 5,812,819 | A | 9/1998 | Rodwin et al. ............. 395/500 |
| 5,835,723 | A | 11/1998 | Andrews et al. ........ 395/200.56 |
| 5,848,233 | A | 12/1998 | Radia et al. ........... 395/187.01 |
| 5,862,345 | A | 1/1999 | Okanoue et al. ....... 395/200.68 |
| 5,872,524 | A | 2/1999 | Iida ........................ 340/825.52 |
| 6,023,464 | A | 2/2000 | Woundy ..................... 370/352 |
| 6,170,061 | B1* | 1/2001 | Beser ......................... 713/201 |
| 6,223,222 | B1* | 4/2001 | Fijolek et al. .............. 709/227 |
| 6,263,369 | B1* | 7/2001 | Sitaraman et al. .......... 709/225 |
| 6,373,817 | B1* | 4/2002 | Kung et al. ................. 370/217 |
| 6,487,594 | B1* | 11/2002 | Bahlmann .................... 709/225 |
| 6,553,568 | B1* | 4/2003 | Fijolek et al. .............. 725/111 |
| 6,578,088 | B2* | 6/2003 | Ohno et al. ................. 709/245 |
| 6,587,882 | B1* | 7/2003 | Inoue et al. ................ 709/227 |
| 6,697,360 | B1* | 2/2004 | Gai et al. .................... 370/389 |
| 6,708,219 | B1* | 3/2004 | Borella et al. ............. 709/245 |
| 6,779,004 | B1* | 8/2004 | Zintel ......................... 709/227 |
| 6,880,000 | B1* | 4/2005 | Tominaga et al. .......... 709/220 |

OTHER PUBLICATIONS

Managing IP Addressing in Optivity NetID (version 4.2.2, Jan. 2001, Published by Nortel Networks).*
R. Droms, "Dynamic Host Configuration Protocol", Mar. 1997, pp. 1-45.
S. Alexander, et al., "DHCP Options and BOOTP Vendor Extensions", Mar. 1997, pp. 1-34.

* cited by examiner

*Primary Examiner*—John Follansbee
*Assistant Examiner*—Mohammad Siddiqi
(74) *Attorney, Agent, or Firm*—Hickman Palermo Truong & Becker LLP

(57) ABSTRACT

A method for automatically managing network addresses in a managed access environment is described. A managed access environment is defined as one in which a service provider delegates responsibility for a portion of their address space to an access provider, which is responsible for distributing the addresses to devices used by subscribers of the service provider. An aspect of the invention allows rule-action associations to be defined. The method includes accessing network address utilization data and evaluating rule conditions in relation to the utilization data. When a rule condition is met, an associated address management action is executed. Different embodiments of the invention provide execution of different actions, such as allocating, reconfiguring, and reclaiming addresses from a service provider's address space.

44 Claims, 6 Drawing Sheets

AUTOMATED MANAGEMENT OF NETWORK ADDRESSES IN A BROADBAND MANAGED ACCESS ENVIRONMENT

FIELD OF THE INVENTION

The present invention generally relates to computer networks, and more specifically to automated management of network addresses based on address utilization conditions.

BACKGROUND OF THE INVENTION

In dial-up network access, network subscribers typically select a service provider by connecting through the Public-Switched Telephone Network (PSTN) by dialing a telephone number of a service provider point-of-presence (POP) using a modem. The PSTN carries a normal telephone call that typically uses PPP (Point-to-Point Protocol) technology to provide connectivity with the service provider.

With the advent of widespread broadband network deployments, the role of service providers is changing dramatically. In the past, Internet Service Providers (ISP) had complete control of their subscribers and the maintenance of the subscribers' network connections. In broadband access networks, Network Access Providers (NAP), which provide the connectivity between a subscriber and their service provider, have become responsible for the configuration and maintenance of the subscribers' connections and, often times, their equipment. Service providers own an address space that is delegated to a NAP for assignment to network devices on a subscriber's behalf. The role of service providers is also evolving, in that Network Service Providers (NSP) are being created to provide various network-based services, such as video, voice, and applications. Such services are well suited to broadband network delivery, due to the relatively large amount of bandwidth required for delivery, in comparison with traditional HTML web pages.

In a broadband access network, such as a cable network, a subscriber chooses a service provider by using the subscriber's IP address, or layer-3 identity, instead of using a dial-up telephone number. Assigning the layer-3 identity is a job that is well-suited for a NAP since the assignment of addresses must be made with awareness of both the physical and logical network topologies in order to maximize route summarization and provide efficient routing of transmissions. Hence, a primary challenge facing both NSPs and NAPs is the allocation and management of network addresses, such as IP addresses, to their customers/subscribers. Furthermore, certain government requirements for equal and open access to broadband network infrastructure has complicated the configuration, deployment and administration of NAP networks. As NAPs bring multiple NSPs onto their networks, the addressing challenge becomes more complicated and thus significant. NAPs need to manage not only their address space but also that of their NSP partners, and that of devices, such as cable modems and personal computers, in individual homes and businesses.

Typically, Dynamic Host Configuration Protocol (DHCP) servers are the mechanism used to provide and maintain client addresses. The various DHCP specifications do not provide a common process to provision DHCP servers with address blocks and their associated parameters and policies. Therefore, network operations generally use manual administrative processes for IP address configuration, and often use simplistic tools such as spreadsheets for address management and maintenance. These processes require significant time and attention from system administrators.

With the widespread proliferation of Internet users, and the limitations due to a finite number of available addresses, IP addresses continue to be both necessary and relatively scarce. These resources are highly valued by organizations, particularly by those which generate direct revenue based on their ability to bring subscribers online and/or provide IP-based services to their subscribers. The need for intelligent and efficient management of IP address resources has become increasingly critical as organizations and the services they offer become more complex.

Based on the foregoing, it is clearly desirable to provide a technique that overcomes the manual approach to managing network addresses in a broadband managed access network environment. A more specific, previously unmet, need exists for automated techniques for delivering, controlling, tracking and exchanging IP address space across multiple DHCP servers.

SUMMARY OF THE INVENTION

The foregoing needs, and other needs that will become apparent from the following description, are satisfied by the present invention, which comprises in one aspect, a method for automatically managing network addresses in a managed access environment. A managed access environment is defined as one in which a service provider delegates responsibility for a portion of their address space to an access provider, which is responsible for distributing the addresses to devices used by subscribers of the service provider.

An aspect of the invention allows rule-action associations to be defined and stored. One embodiment allows the rule-action associations to be defined by a user. The method includes accessing network address utilization data and evaluating rule conditions in relation to the utilization data. When a rule condition is met, an associated address management action is executed. Different embodiments of the invention provide execution of different actions, such as allocating, reconfiguring, and reclaiming addresses from a service provider's address space, as well as notifying a list of recipients that the condition is met.

An aspect of the invention provides for delegating address scopes, which are administrative grouping of addresses that are distributed to network-connected devices and associated policies, to the network elements that actually perform the distribution of addresses to the devices. In certain aspects, tasks in support of address delegation are performed, such as provisioning the address distributing element (e.g., DHCP server) and configuring appropriate routers to route to the new scopes.

Furthermore, aspects of the invention are implemented in a computer system, an apparatus, and a computer readable medium.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In view of the shortcomings described above in relation to managing the network address space in a managed access environment, automating the intelligent management of address space is highly desirable. A method for automatically managing network addresses is described. Aspects of the method are used to dynamically allocate and manage Internet Protocol (IP) addresses across an access network in a managed access environment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present invention comprises, in one aspect, a method for automatically managing network addresses across a network. Other aspects and features of the invention will become apparent from the following detailed description. For example, in other aspects, the invention encompasses a computer system, an apparatus, and a computer readable medium configured to carry out the steps described herein.

1.0 General Overview

According to one aspect of the invention, a user can specify and store rules and associated executable actions for use in automated address management. The rules are generally defined as conditions in relation to the utilization of blocks of network addresses assigned to an entity, such as an Internet Service Provider (ISP), or the utilization of the entire address space of an entity, which may encompass multiple contiguous or non-contiguous address blocks. Upon determination that a rule has been satisfied, an action upon the network address space is performed.

The various aspects of the invention can be utilized in a broadband access network, in which a service provider typically delegates responsibility for a portion of their address space to an access provider. The access provider is typically responsible for distributing the addresses to devices used by subscribers of the service provider. For example, America Online, Inc. (AOL), as a service provider, may provide cable Internet access and services routed through Time Warner's cable access network. Time Warner, as an access provider, manages the address space assigned to AOL subscribers. This type of network environment is referred to herein as a managed access environment.

Embodiments are at times described herein with reference to cable access networks as one exemplary context in which the processes described herein can be implemented. However, the invention is not limited to use with cable networks. The processes described herein are specifically applicable to any networking environment in which dynamic addresses are utilized.

2.0 Operating Environment Example

Figure 1:
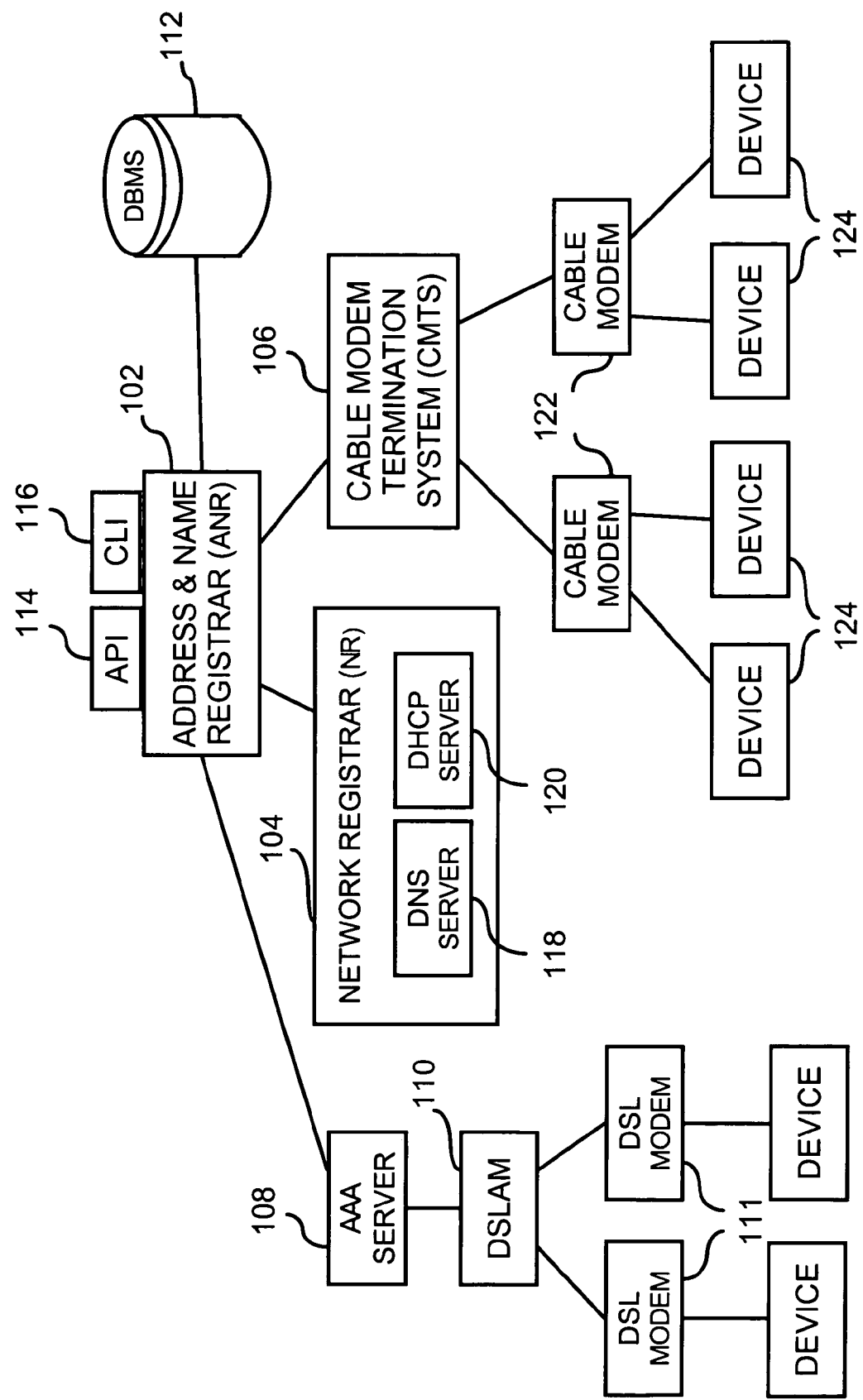
FIG. 1 is a block diagram illustrating examples of environments in which aspects of the invention may operate.

FIG. 1 is a block diagram illustrating an example of an environment in which aspects of the invention may operate. The functionality offered by the methods described herein is primarily embodied in the address and name registrar (ANR) 102. In one aspect of the invention, ANR 102 accesses network address utilization information from a network registrar (NR) 104. Based on the utilization data, ANR 102 manages the NR 104 and the cable modem termination system (CMTS) 106 through specified actions. In another aspect, ANR 102 interfaces with an Authentication, Authorization and Access (AAA) server 108. AAA server 108 communicates with a Digital Subscriber Line Access Multiplexer (DSLAM) 110 in a DSL environment to authenticate users of DSL modems 111, which are communicatively coupled to DSLAM 110 and to devices, for example, personal computers, to transmit network communications therebetween. In one embodiment, AAA server 108 is a Remote Authentication Dial-In User Service (RADIUS) server.

ANR 102 provides a public API (Application Program Interface) 114 and CLI (Command Line Interface) 116 through which a user can administer the ANR 102. An API, such as API 114, enables external applications to make requests of and utilize the capabilities of ANR 102. In one embodiment, API 114 is based on the Java programming language and uses an RPC (Remote Procedure Call) mechanism for accessing ANR 102 over a network. A CLI, such as CLI 116, is a tool for providing interface capabilities to a user such that commands and responses can be exchanged between the user and ANR 102. In one embodiment, CLI 116 is implemented using calls to the API 114, and can be accessed remotely over the network. CLI 116 commands can be executed interactively or in batch by executing scripts that use CLI 116 commands. Other functional components of ANR 102 and information used by ANR 102 are described in detail in reference to FIG. 2.

Through the API 114 and the CLI 116, access providers can add address blocks to be dynamically managed by ANR 102. In addition, these interfaces can be used to block statically allocated addresses, subnets, and address ranges that are not meant to be part of the dynamic address management process. A subnet, in this context, represents a routable block of addresses.

In one embodiment, ANR 102 is communicatively connected to a database management system (DBMS) 112, which provides a repository for data utilized by ANR 102. The DBMS 112 may be a relational system, or other form of data repository. Data that is stored in the DBMS 112 is, at times during execution of the methods described herein, represented in memory local to ANR 102.

FIG. 1 depicts an embodiment in which the NR 104 includes a DNS (Domain Name Service) server 118 and a DHCP (Dynamic Host Configuration Protocol) server 120, such as in Cisco Name Registrar (CNR) available from Cisco Systems, Inc., San Jose, Calif. These components can execute on the same computer hardware, or can be distributed on separate computer hardware devices. DNS server 118 is conventionally used to map domain names into IP addresses in response to client requests. DHCP server 120 is typically used to centrally manage and automate the assignment and distribution of IP addresses to devices on a network. In one embodiment, DHCP server 120 serves as the source of address utilization data that ANR 102 requests, processes, and responsively acts upon. In one embodiment, ANR 102 periodically requests utilization data from DHCP server 120 according to a user-specified frequency.

CMTS 106 is typically located at a cable company office and is used to exchange digital signals with a cable modem, such as cable modem 122, on a cable network. Generally, when a CMTS 106 receives signals from a cable modem 122, it converts these signals into IP packets, which are then sent to a router for transmission across the Internet. In some implementations, and as illustrated in FIG. 1, the CMTS 106 provides router capabilities. An example of a CMTS broadband router is the uBR 7200 series available from Cisco Systems, Inc. In one embodiment, some of the actions performed by the ANR 102 are performed upon the CMTS 106 in response to utilization data provided by DHCP server 120.

Cable modems 122 and devices 124 are client-side components used to access and exercise a cable access network. The client-side components are typically located at a ISP subscriber location, such as a home or office, and are used to access the services provided by the ISP. Devices 124 depict the devices on a network to which IP addresses are allocated and managed, through DHCP server 120, by an access provider for an ISP, utilizing the methods described herein and primarily embodied in the ANR 102. For example, devices 124 are personal computers, workstations, Internet appliances, etc.

The example operating environment illustrated in FIG. 1 is primarily directed at a cable network environment, but the methods described herein are applicable to various environments in which network addresses are utilized in a dynamic manner. For example, aspects of the invention may be implemented in a DSL environment whereby the ANR 102 interacts with a AAA server 108 to effect a DSLAM 110. For another example, aspects of the invention may be implemented in an environment in which modems constituent to a modem pool communicate with PC-based modems through the PSTN.

The elements illustrated in FIG. 1 are interconnected through one or more networks (not shown), such as a LAN (Local Area Network) or WAN (Wide Area Network). For example, ANR 102 may communicate with DBMS 112 over an enterprise LAN, whereas ANR 102 may communicate with NR 104 and CMTS 106 over a LAN if all are co-located or over a PSTN (Public Switched Telephone Network) or cable WAN if remotely located. Any suitable proprietary or standard communication protocol, for example, TCP/IP (Transmission Control Protocol/Internet Protocol), is sufficient for communications between ANR 102 and NR 104, AAA 108 and DBMS 112.

In one embodiment, ANR 102 communicates with CMTS 106 by transmitting commands via Telnet and associated communication protocols. In another embodiment, ANR 102 communicates with CMTS 106 using SNMP (Simple Network Management Protocol), a network monitoring and management protocol that is described in numerous IETF (Internet Engineering Task Force) RFCs, which can be found at www.ietf.org. These communication protocols are examples, and any suitable communication protocol would suffice. Furthermore, benefits can be obtained by implementing secure communication between the ANR 102 and the CMTSs 106, over the network. For example, such communications may be secured using SSH (Secure Shell) technology for authentication and security over unsecured channels.

ANR 102 can be implemented in a number of locations within a cable network. For example, ANR 102 may reside at a cable head-end (HE) facility, a regional data center (RDC), or at a national data center (NDC); serving the needs of users served by these facilities. In addition, ANR 102 can be implemented in a hierarchical fashion, whereby an ANR 102 resides at each location described above and supports hierarchical and peer relationships. In a hierarchical implementation, an ANR 102 can allocate and reclaim address space from another peer ANR 102, as well as determine utilization of address space under management by a subsidiary ANR 102. In addition, through a hierarchical implementation an ANR 102 supports logically upward aggregation of data directed toward an ARIN (American Registry of Internet Numbers) and logically downward delegation of resources (to a DHCP server), and peer-to-peer reporting and delegation relationships in support of managed access activities.

3.0 Address & Name Registrar (ANR)

A method for automatically managing network address space, preferably in a managed access environment, based on rule-action associations, is now described.

Figure 2:
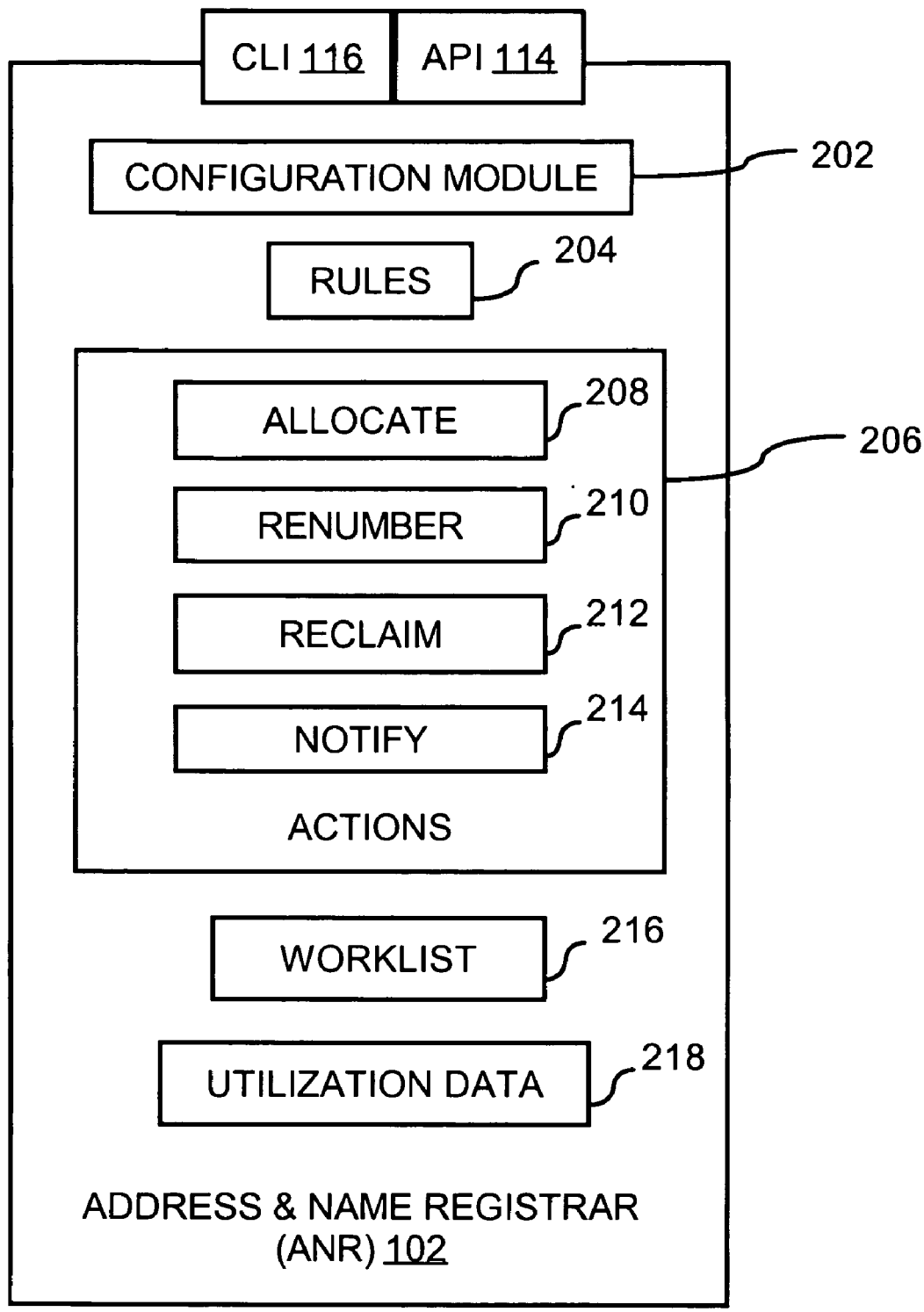
FIG. 2 is a block diagram illustrating functional components of an Address and Name Registrar (ANR)

FIG. 2 is a block diagram illustrating functional components of Address and Name Registrar (ANR) 102. As previously described, ANR 102 comprises an API 114 and a CLI 116, providing interfaces to users and other applications. In addition, ANR 102 comprises a configuration module 202, rules 204, actions 206, a worklist 216, and utilization data 218.

3.1 Configuration Module

The configuration module 202 is generally for configuring ANR 102 and facilitating storage of configuration information in DBMS 112 (FIG. 1). Configuring ANR 102 includes (A) defining the NRs 104 (FIG. 1) and CMTSs 106 (FIG. 1) to be managed by ANR 102; (B) synchronizing the ANR 102 with the NRs 104 and CMTSs 106; and (C) associating address blocks to their ISP owners.

With respect to step (B), ANR 102 is not the authoritative source for information stored in network elements such as NR 104 (FIG. 1; specifically DHCP server 120) and CMTS 106 (FIG. 1), so in one embodiment, information is imported into ANR 102 and stored in persistent cache. Thus, the cache may become non-synchronized with the authoritative sources and periodic synchronization is beneficial. DHCP servers 120 maintain various configuration information about the address space, or scopes, that they distribute. A scope is an administrative grouping of addresses that will be distributed by a DHCP server 120 to network-connected devices, such as devices 124 (FIG. 1), and an associated policy that controls how DHCP server 120 (FIG. 1) may operate upon the addresses. Scopes may include contiguous or non-contiguous address blocks, and are not typically manipulated directly through ANR 102, but are created automatically when address space is allocated by an ANR 102 or when ANR 102 is synchronized with NRs 104, and thus DHCP servers 120. If the NRs 104 assigned to be managed by an ANR 102 (step A) are already configured with scope information, then this information is copied to the ANR 102 data model, or synchronized. In addition, CMTSs 106 maintain information about their configuration. For example, a CMTS 106 is configured with physical interfaces and sub-interfaces, and subnets are assigned to sub-interfaces. In one embodiment, a sub-interface of a physical interface is assigned to each ISP utilizing the CMTS 106. Hence, synchronization of ANR 102 includes the sharing of this CMTS 106 information.

The user can initiate the synchronization process via the API 114 or the CLI 116, or the process can be initiated through a scheduler job. Utilizing the API 114 or the CLI 116 allows synchronization of individual NRs 104 (FIG. 1) or CMTSs 106 (FIG. 1), or synchronization of all of them at the same time. If a failure occurs during synchronization, such as a communication failure or unacceptable data is encountered, the process is aborted and the relevant NR 104 or CMTS 106 is flagged within ANR 102 as being problematic. When synchronizing all relevant network elements in a single operation, failure to synchronize a single element does not cause an abort of the entire process, but the problematic element is flagged within ANR 102 and synchronization continues.

With respect to step (C), since within ANR 102 address blocks are associated with their owners (ISPs), ANR 102 is capable of associating network information related to the address blocks from the NRs 104 (FIG. 1) with the owners. Hence, when changes are made to the address space, these changes affect the CMTS 106 (FIG. 1) sub-interfaces and ANR 102 is capable of modifying the CMTS 106 configuration accordingly. More specifically, when a new subnet is allocated for an owner on a CMTS 106, ANR 102 will push the address block and network mask to the CMTS 106 sub-interface associated with the owner of the subnet, create a scope for the subnet, and push it to the DHCP server 120 (FIG. 1). This process is automatically performed by ANR 102 and, consequently, the DHCP server 120 will be able to distribute addresses from the new scope and the CMTS 106 will be able to route the network traffic to the correct destination, with no manual configuration required.

3.2 Rules

Referring to FIG. 2, ANR 102 can automatically allocate, and otherwise manage, address space on an access network with the execution of customizable rules 204. In one embodiment, the rules 204 are defined by a user, for each owner (ISP). Rules 204 are periodically evaluated. In one embodiment, the frequency of (or interval between) rule 204 evaluations is configured by a user. In one embodiment, the rule 204 evaluation is initiated via a CLI 116 command that is scheduled via a system scheduler (not shown), which can be ANR-specific or provided by an operating system. When a rule's condition is met, the corresponding action 206 is noted on a worklist 216, for execution.

Rules 204 are typically created via the API 114 (FIG. 1) or the CLI 116 (FIG. 1), whereby its condition and action are specified. In one embodiment, each rule 204 has one condition and specifies an action 206 to be triggered upon meeting the condition. ANR 102 accepts variables to the conditions and actions, such as a condition threshold and "window" values. For example, a condition may be: over the past seven days, address utilization on NR XX averaged greater than ninety-five percent. A responsive action might be to allocate more addresses (an action described in detail below). For another example, a condition may be: over the last ten days, address utilization on NR YY averaged less than ten percent, to which a responsive action might be to reclaim addresses (an action described in detail below). Furthermore, when a rule 204 is created, its owner is specified, and that rule is applied only to the specified address blocks that are owned by the owner associated with the particular rule.

If multiple rules are defined for a network, it is possible that the conditions of more than one rule are met as a result of rules evaluation. In one embodiment, ANR 102 does not attempt to resolve the conflicts among rules, wherein all of the actions corresponding to the passed rules are executed. In other embodiments, ANR 102 can attempt to resolve the conflicts in order to execute a single action, or ANR 102 can notify a user of the conflict and await further direction.

Upon meeting a condition and consequently determining that an action should be executed, in one embodiment, an electronic mail notification is automatically generated and transmitted to a recipient list. In another embodiment, a notification is only generated if the rule 204 specifies such an action, as described herein with respect to notify action 214. In another embodiment, the action is automatically performed without any notification. ANR 102 provides options as to whether to automatically perform an action upon meeting a condition, or to notify a recipient list and await confirmation of the action.

3.3 Address Utilization Data

During a rules evaluation cycle, determination of whether rule 204 conditions are met is based on comparison of the conditions to address utilization data 218 collected from all DHCP servers 120 (FIG. 1) currently being managed by ANR 102. In one embodiment, the frequency of utilization data collection is configurable by a user. In one embodiment, the collection is initiated via a CLI 116 command from a conventional system scheduler. When collection is triggered, ANR 102 polls the relevant DHCP servers 120 for their address utilization data 218. The following data is determinable by the ANR 102: (A) percentage of address space in use at one CMTS 106 (FIG. 1) physical interface (or sub-interface) over the total address space available to the owner; (B) percentage of address space in use at one CMTS 106 physical interface over the total address space allocated by the owner; and (C) percentage of address space in use at one CMTS 106 physical interface over the amount of address space allocated to that interface and to an owner. Furthermore, it is within the scope of the invention to poll CMTSs 106 directly for some utilization data 218.

The allocate action 208, renumber action 210, and reclaim action 212 are described in detail below in reference to other figures, specifically FIG. 3, FIG. 4, and FIG. 4, respectively.

3.4 Rule-Based Actions

As is depicted in FIG. 2, one of the available rules 206 is a notify rule 214, which notifies a recipient list and awaits confirmation before executing the action. The content of a notification e-mail should contain sufficient information to enable a user to manually execute the work item. For example, the e-mail can include the worklist ID, action ID, why the action is on the worklist, what the action will actually perform in the context of the associated network, and whether the action is in an auto-confirm status or not. In any case, a new work item corresponding to the specified action 206 is created in the worklist 216. Work items corresponding to the specified action 206 are executed in the next execution cycle if they have been cleared for execution. Cleared work items do not include actions requiring confirmation that have not yet been confirmed at the time of worklist 216 execution. In one embodiment, if a work item is not executed, and address utilization conditions that triggered the action persist, the same action will be added to the worklist 216 and scheduled for execution at the next rules evaluation cycle, with no record of a previous non-confirmation (or non-acknowledgement).

Figure 3:
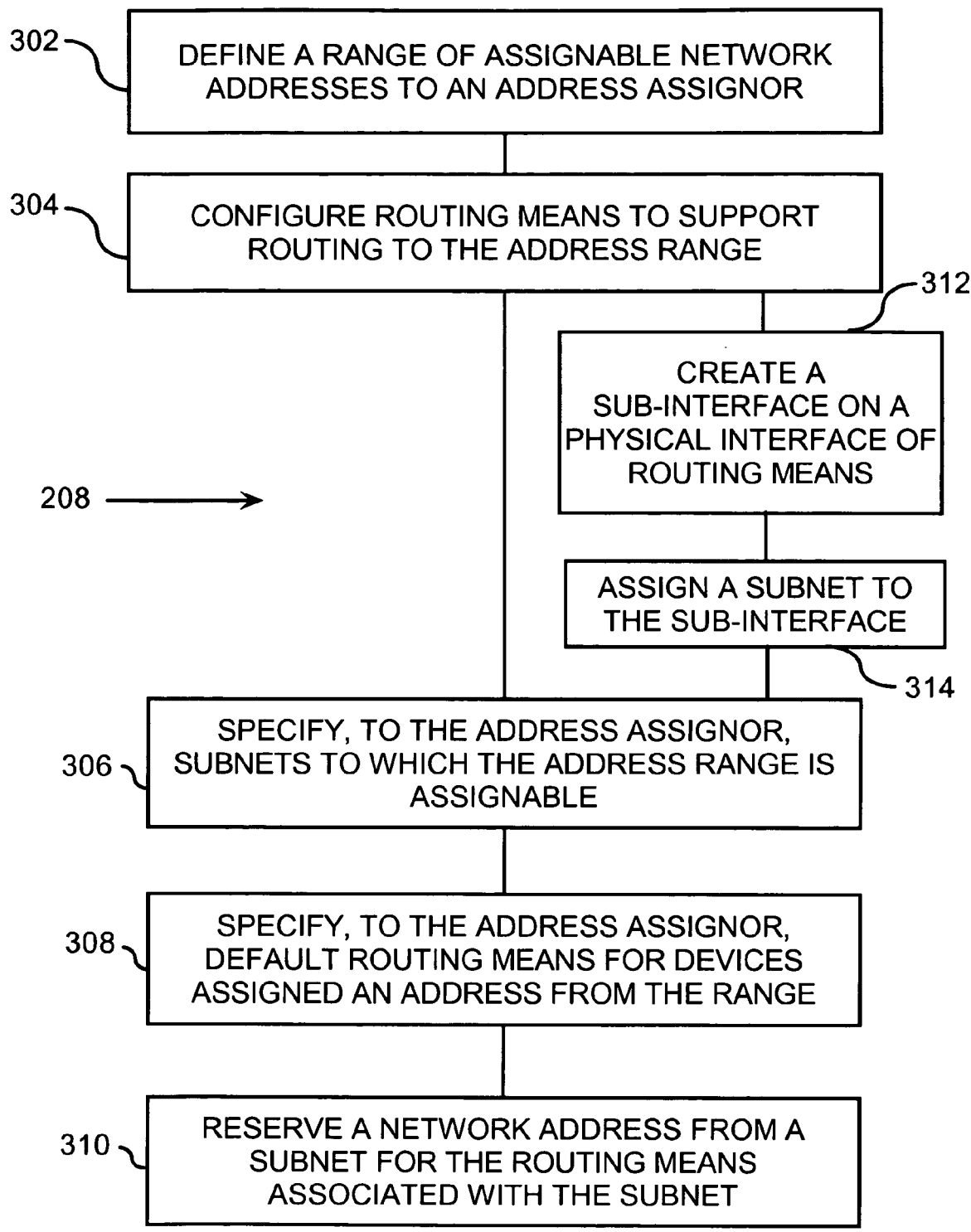
FIG. 3 is a flowchart illustrating steps for performing an allocate action.

FIG. 3 is a flowchart illustrating steps for performing an allocate action 208 (FIG. 2), typically in response to a rule 206 (FIG. 2) condition being met upon comparison of the condition with utilization data 218 (FIG. 2). ANR 102 (FIG. 1) provides the capability to dynamically allocate addresses from an owner's address space. The dynamic address allocation invokes an algorithm that provides efficient address distribution to routers to facilitate traffic aggregation, and efficient utilization of scopes defined on a DHCP server 120 (FIG. 1) of NR 104 (FIG. 1).

At step 302, additional scopes, which include one or more address blocks and attributes for affecting which addresses DHCP server 120 (FIG. 1) distributes, are created in DHCP server 120 so that the addresses can be distributed to devices 124 (FIG. 1). In one implementation, templates can be used to augment the scope creation task. Scope attributes include, for example, policies that define the name of a set of DHCP server 120 attributes which the DHCP server 120 will deliver to a client upon a request for an address. These policies may include, for example, information such as address lease time, as well as other DHCP server 120 options. Selection tags, which are identifiers that describe types of scope configurations, are used by DHCP server 120 in selecting an appropriate address block from which to fulfill an address request.

In one embodiment, a scope is created for each subnet that is assigned to a CMTS 106 (FIG. 1) associated with the DHCP server 120. When referring to a scope, this could mean multiple scopes. At step 304, CMTSs 106, or other routing means, are configured to support routing transmissions (typically in the form of data packets) to the addresses delineated in the scope. At step 306, subnets to which addresses from the scope can be distributed are specified to the DHCP server 120. A CMTS 106 must have an address in each subnet that is assigned to it. Thus, at step 310, an address is reserved for the CMTS 106 in each associated subnet. At step 308, default router policy is defined for each scope being distributed by a particular DHCP server 120. That is, for any device 124 being assigned an address from a particular scope, the next hop router, or CMTS 106, is defined for that particular device 124. Although steps 306 and 308 are depicted as separate steps for illustrative purposes, these steps are essentially performed simultaneously.

In one embodiment, additional steps are performed in support of step 304, that is the step of configuring the routing means (CMTS 106 of FIG. 1) to support routing to the address blocks specified in a scope. At step 312, if not already existing, a sub-interface is created for each owner/ISP for each physical interface of the CMTS 106. If the appropriate sub-interfaces already exist, then secondary address are added to the CMTS 106 in furtherance of assigning a subnet to a sub-interface. In either case, at step 314, subnets are assigned to sub-interfaces of CMTS 106.

In one embodiment, ANR 102 (FIG. 1) allows users to specify an individual CMTS 106 (FIG. 1) or a group of CMTSs 106 to seed, or assign addresses to, in an action. In another embodiment, users can specify the size of address space, as a percentage of an address block or as an absolute number, to seed the CMTS 106 interfaces with. In another embodiment, ANR 102 can distribute an address block based on an existing distributed address block. Thus, an existing address block can be replaced with a larger address block without disturbing the existing allocation, essentially allowing address blocks to be exchanged. In still another embodiment, additional addresses can be allocated for an owner according to specification by a user. For example, the user can specify the number of addresses (as an absolute number or as a percentage of scopes), physical interfaces of specific CMTSs 106, and the owner (and thus sub-interface). With this information, ANR 102 can determine where in the owner's address space to allocate the requested number of addresses, and it can configure the CMTS 106 and DHCP server 120 accordingly.

Figure 4A:
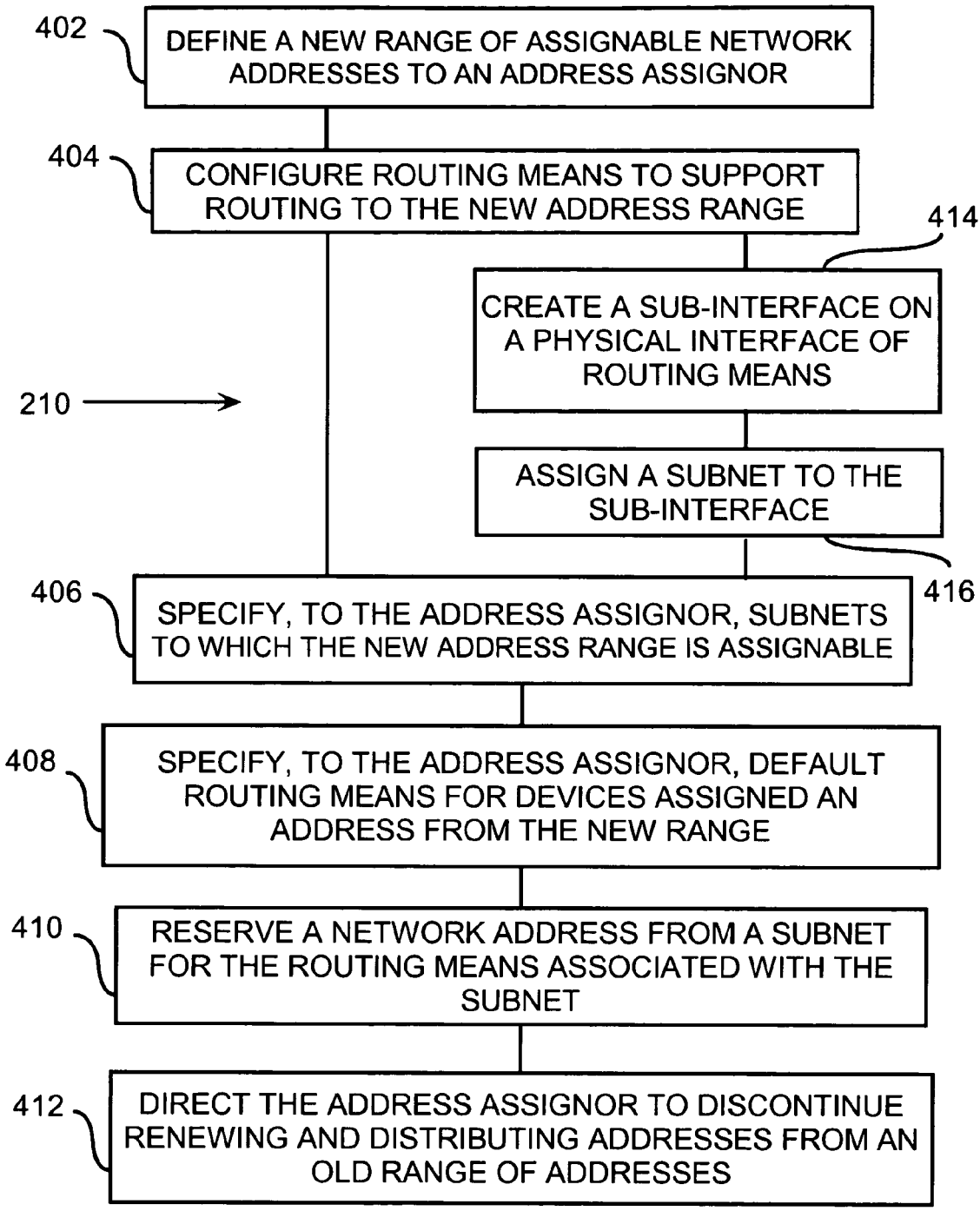
FIG. 4A and FIG. 4B are flowcharts illustrating steps for performing a renumber action.

FIG. 4A is a flowchart illustrating steps for performing a renumber action 210 (FIG. 2), typically in response to a rule 206 (FIG. 2) condition being met upon comparison of the condition with utilization data 218 (FIG. 2). ANR 102 (FIG. 1) provides the capability to renumber addresses from an owner's dynamic address space, and thus renumbering subnets, including reconfiguring DHCP server 120 (FIG. 1) scopes and CMTS 106 (FIG. 1) interfaces accordingly. The renumber action 210 allows address owners to move, extend, or shrink address blocks on particular segments of their networks, through the creation of new scopes to essentially replace the current, or old, scopes. For example, ANR 102 can facilitate splitting a /24 address block into two /25 blocks or aggregate two /24 blocks into a /23 block. One beneficial application of the renumber action 210 is to replace multiple "small" address blocks (old scopes) with fewer (at times, a single) "large" address blocks (new scopes). In addition to providing beneficial flexibility to address owners, the renumber action 210 also improves network performance and simplifies router management (technically and logically) by assisting in maintaining contiguous subnets.

Essentially, the renumber action 210 can be envisioned as a combination of an allocate action 208 (FIG. 2) and a reclaim action 212 (FIG. 2). Referring to FIG. 4, at step 402, new scopes are allocated, or created in DHCP server 120 (FIG. 1) so that they can be used to move subnets into. In one embodiment, a scope is created for each subnet that is assigned to a CMTS 106 (FIG. 1) associated with the DHCP server 120. Again, when referring to a scope, this could mean multiple scopes. At step 404, CMTSs 106, or other routing means, are configured to support routing transmissions to the addresses delineated in the scope. At step 406, subnets to which addresses from the scope can be distributed are specified to the DHCP server 120. A CMTS 106 must have an address in each subnet that is assigned to it. Thus, at step 410, an address is reserved for the CMTS 106 in each associated subnet. At step 408, default router policy is defined for each scope being distributed by a particular DHCP server 120. That is, for any device 124 being assigned an address from a particular scope, the next top router, or CMTS 106, is defined for that particular device 124. Although steps 406 and 408 are depicted as separate steps for illustrative purposes, these steps are essentially performed simultaneously.

Figure 4B:
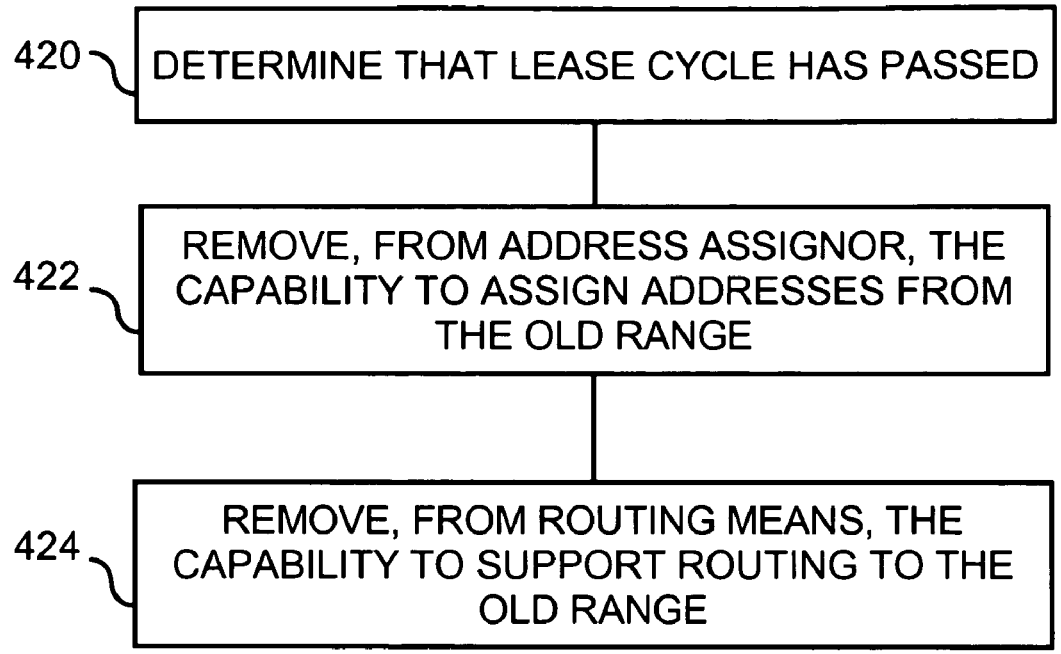

FIG. 4B is a flowchart continuing from FIG. 4A, illustrating further steps for performing a renumber action 210 (FIG. 2). Steps 412 of FIG. 4A and 420–424 of FIG. 4B involve disabling the old scopes, since the new scopes have been sufficiently defined and the network components have been configured accordingly, to allow subnets to be moved from the old scopes to the new scopes. More specifically, at step 412 the DHCP server 120 (FIG. 1) is directed to disable old scopes, that is, to discontinue renewing and distributing addresses from the old scopes. Typically, DHCP server 120 servers distribute addresses to devices 124 (FIG. 1) on a lease basis, whereby at certain intervals (i.e., a lease cycle) the client devices 124 are required to request renewal of their address from the DHCP server 120. Referring back to the context of step 412; once the DHCP server 120 has been directed to disable the old scopes, if a device 124 requests renewal of its address from a disabled scope, the DHCP server 120 will not renew the address but will assign an address from one of the new scopes to the requesting device 124. Similarly, if a new device 124 requests an address, the DHCP server 120 will assign an address from a new scope.

Referring to FIG. 4B, ANR 102 (FIG. 1) then awaits the passage of one lease cycle. At step 420, it is determined that a lease cycle has passed. Upon the passing of a lease cycle, the old scopes are removed from the DHCP server 120 and hence, the ability to assign addresses from the old range of addresses is removed, at step 422. At step 424, the addresses associated with the old scopes are removed from the routing tables of the CMTSs 106 and hence, the ability to support routing to the old range of addresses is removed. Although steps 422 and 424 are depicted as separate steps for illustrative purposes, these steps can be performed virtually simultaneously. By the end of one lease cycle, all client devices 124 will have requested renewal and consequently been assigned new addresses from the new scopes, or some devices 124 have gone off-line and upon their return on-line they have requested and been assigned an address from the new scopes. At this point in the process, all devices that were formerly assigned addresses from the old scopes have been assigned addresses from new scopes. The process or removing the scopes from the DHCP server 120 and removing the addresses from the CMTSs 106 is essentially the allocate action 208 process operating in reverse order.

In one embodiment, additional steps are performed in support of step 404, that is the step of configuring the routing means (CMTS 106 of FIG. 1) to support routing to the address blocks specified in a scope. At step 416, if not already existing, a sub-interface is created for each owner/ISP for each physical interface of the CMTS 106. If the appropriate sub-interfaces already exist, then secondary address are added to the CMTS 106 in furtherance of assigning a subnet to a sub-interface. In either case, at step 418, subnets are assigned to sub-interfaces of CMTS 106.

The reclaim action 212 (FIG. 2) provides the capability to recall or reclaim addresses from devices 124 (FIG. 1), typically in order to allow alternative uses of the addresses. The reclaim action 212 may be in support of a larger defragmentation exercise over an owner's complete address space in order to configure their networks more efficiently. The reclaim action 212 includes steps 412 and 414 of FIG. 4, whereby the DHCP server 120 (FIG. 1) is directed to disable old scopes, a lease cycle is allowed to pass, and the scopes and associated addresses are removed (at least in their present form) from the DHCP server 120 and the CMTSs 106. In the reclaim action 212 context, the old scopes are the scopes that the owner wants to reclaim for other uses, for example, to free contiguous blocks of addresses for assignment to a particular subnet. The reclaim action 212 can be executed solely, without executing the allocate action 208 or renumber action 210.

4.0 Implementation Mechanisms

Embodiments may be implemented in one or more software elements. In one specific implementation, the foregoing processes depicted in FIGS. 3 and 4 are implemented using the Java programming language. In one implementation, the CLI 116 (FIG. 1) is implemented in TclBlend, a Java/Tcl integration layer, and uses the Java client library (Jcl) provided by ANR 102 (FIG. 1).

In one implementation, ANR includes an Apache HTTP web server. In one implementation, the Java client library is a wrapper around the SOAP RPC protocol, which is a public standard method of encoding data for wire transport between different operating systems. The SOAP RPC protocol is used by ANR 102 and is supported by a Java servlet that accepts SOAP RPC requests and calls the appropriate API. The API comprises two parts. The first part is the remote stubs, which are encapsulated in the Jcl, which allows clients to make Java calls that are automatically converted to SOAP and passed to the server via HTTP. The second part is the server side implementation, which is invoked by the SOAP servlet as requests are accepted.

In one implementation, a SQL database is used to persistently store data for which ANR 102 (FIG. 1) is authoritative, as well as data the ANR 102 is caching but for which it is not authoritative. This database is accessed via a JDBC interface.

5.0 Hardware Overview

Figure 5:
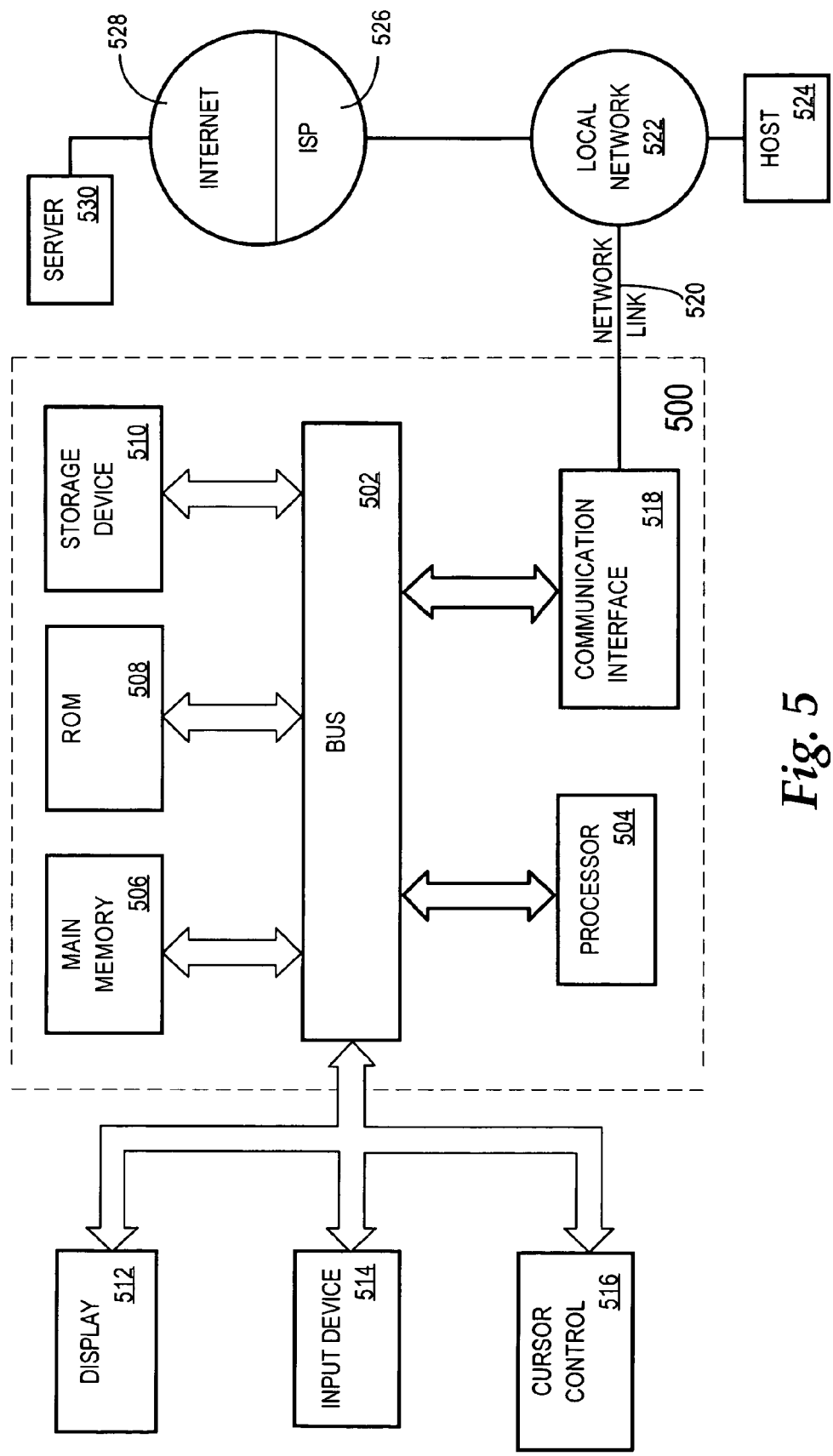
FIG. 5 is a block diagram illustrating a computer system upon which aspects of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk, optical disk, or magneto-optical disk, is provided and coupled to bus 502 for storing information and instructions.

Computer system 500 may be coupled via bus 502 to a display 512, such as a cathode ray tube ("CRT") or a liquid crystal display ("LCD"), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for automatically managing network addresses in a managed access environment. According to one embodiment of the invention, automatic management of network addresses is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical, magnetic, or magneto-optical disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for automatically generating a replication topology for a directory service as described herein.

Processor 504 may execute the received code as it is received, and/or stored in storage device 510, or other non-volatile storage for later execution. In this manner, computer system 500 may obtain application code in the form of a carrier wave.

6.0 Extensions and Alternatives

Alternative embodiments of the invention are described throughout this specification, and, for purposes of clarity and context, in locations that best facilitate understanding the context of the embodiments.

In the foregoing description, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while certain descriptions herein have referred to use of particular communication protocols such as TCP/IP and Telnet, and particular protocol-dependent types of network addresses such as IP addresses, the invention is not limited to use of existing protocols but can be adapted to operate with other, possibly presently undeveloped, protocols. Also, it is foreseen that benefits can be obtained by implementing secure communication between the Address & Name Registrar (ANR) 102 (FIG. 1) and the multiple routers, or CMTSs 106, over the network. For example, such communications may be conventionally encrypted prior to transmission.

In addition, descriptions herein have referred to use of particular types of interfaces such as API and CLI, but the invention is not limited to use of such interfaces. Alternative implementations may benefit from the development of a graphical user interface, for example.

In addition, the description presents exemplary rules that may be specified to trigger an associated action. Within the scope of the invention, rule conditions are customizable, that is, actions can be specified to trigger off of any condition. Conditions can be implemented through Java classes, thus customizable conditions can be defined by installing new classes. Furthermore, an embodiment may provide the capability of defining different rules for different address blocks in an owners space.

In addition, some embodiments are described as utilizing sub-interfaces assigned to each ISP utilizing a CMTS physical interface. This is an implementation of the technology, but the description of the use of sub-interfaces is not intended to limit practice of the invention to such an implementation. An alternative implementation is to locate all of the address information directly on the physical interface instead of employing sub-interfaces.

In addition, the invention is not limited to practice in a cable network environment. The invention is advantageous to any access provider that supports multiple ISPs or address owners, for example, DSL access providers such as telephone equipment owners. Furthermore, the invention can be implemented in any networking environment that utilizes dynamic addressing or that utilizes a DHCP server.

In addition, the techniques described herein are applicable to IPv6 network environments. IPv6 is intended to overcome the challenges posed by the scarcity of IP addresses available in the existing Ipv4 environment, by lengthening IP addresses from 32 bits to 128 bits. Thus, IP addresses are not the scarce network resource in IPv6 environments, but other network identifiers may instead be scarce, such as location prefixes. Therefore, IPv6 network environments will also benefit from the described invention.

In addition, in this description, certain process steps are set forth in a particular order, and alphabetic and alphanumeric labels may be used to identify certain steps. Unless specifically stated in the description, embodiments of the invention are not limited to any particular order of carrying out such steps. In particular, the labels are used merely for convenient identification of steps, and are not intended to imply, specify or require a particular order of carrying out such steps.

What is claimed is:

1. A machine-implemented method for management of network addresses comprising the steps of:

determining an address utilization state of a network, wherein the address utilization state is based on:

a percentage of a certain address space allocated to a network service provider that is in use by at least one of a physical interface and a sub-interface of network access devices that couple subscribers of the network service provider to the network, over a total address space available to the network service provider;

a percentage of address space that is in use at a physical interface over the total address space allocated by the owner; or a percentage of address space in use at a physical interface over the amount of address space allocated to that interface and to a network service provider; and wherein the determining comprises at last one of:
collecting the address utilization data from at least one Dynamic Host Configuration Protocol (DHCP) server of the network; or
polling a broadband terminal directly to obtain the address utilization data therefrom; and
performing a specified action on addresses from the certain address space in response to the determining the address utilization state wherein at least one attribute of the certain address space is changeable with the specified
wherein the performing the specified action comprises:
defining to an address assignor one or more ranges of network addresses wherein the ranges include addresses that are assignable to devices on a network; and
configuring at least one routing means on the network to support routing transmissions to at least one of the network addresses;
specifying to the address assignor one or more sub-networks to which any of the one or more defined network address ranges are assignable;
reserving a network address for a particular router means associated with a particular sub-network from the one or more sub-networks, wherein the reserved network address is from a defined address range assigned to the particular sub-network; and
specifying to the address assignor a particular default routing means for a particular device on the network that is assigned a network address from any of the one or more defined address ranges.

2. The method of claim 1 further comprising the steps of:
comparing the address utilization state with condition information;
upon the address utilization state meeting the condition, completing the step of performing a specified action wherein the specified action is associated with the condition; and
upon the address utilization state not meeting the condition, completing the step of performing a specified action wherein the specified action is a null action.

3. The method of claim 1 wherein the action is allocating a group of specific addresses to a particular network, for assigning the addresses to devices on the particular network.

4. The method of claim 1 wherein the action is reconfiguring addresses on a particular network including more than one address block, resulting in decreasing the number of address blocks associated with the particular network.

5. The method of claim 4 wherein the addresses are reconfigured based on an existing address block.

6. The method of claim 1 wherein the action is reclaiming specific addresses from a particular network, resulting in making the addresses unassignable to devices on the particular network.

7. The method of claim 1 wherein the action is notifying a network access manager that an address utilization condition is met and awaiting a response from the network access manager as to further action to perform.

8. The method of claim 1 wherein the step of determining the state of address utilization comprises querying a Dynamic Host Configuration Protocol (DHCP) server.

9. A machine-implemented method for automated management of network addresses comprising the steps of:
receiving condition information that describes a network address utilization state for triggering an action;
receiving action information describing an action associated with the condition;
determining an address utilization state of a network, wherein the address utilization state is based on:
a percentage of a certain address space allocated to a network service provider that is in use by at least one of a physical interface and a sub-interface of network access devices that couple used by subscribers of the network service provider to the network, over a total address space available to the network service provider;
a percentage of address space that is in use at a physical interface over the total address space allocated by the owner; and
a percentage of address space in use at a physical interface over the amount of address space allocated to that interface and to a network service provider; or
wherein the determining comprises:
collecting the address utilization data from at least one Dynamic Host Configuration Protocol (DHCP) server of the network; or
polling a broadband terminal directly to obtain the address utilization data therefrom; and
performing the specified action on addresses from the certain address space in response to the address utilization state meeting the condition;
wherein the performing the specified action comprises:
defining to an address assignor one or more ranges of network addresses wherein the ranges include addresses that are assignable to devices on a network; and
configuring at least one routing means on the network to support routing transmissions to at least one of the network addresses;
specifying to the address assignor one or more sub-networks to which any of the one or more defined network address ranges are assignable:
reserving a network address for a particular router means associated with a particular sub-network from the one or more sub-networks, wherein the reserved network address is from a defined address range assigned to the particular sub-network; and
specifying to the address assignor a particular default routing means for a particular device on the network that is assigned a network address from any of the one or more defined address ranges.

10. The method of claim 9 wherein the description of the condition and the specification of the action are received from a broadband network access provider that is responsible for distributing network addresses to devices used by subscribers of a network service provider that provides network access through the access network of the network access provider.

11. The method of claim 9 wherein the step of determining the address utilization state comprises querying a Dynamic Host Configuration Protocol (DHCP) server.

12. The method of claim 9 wherein the step of configuring at least one routing means comprises the steps of:
creating one or more sub-interfaces on a physical interface of the routing means, wherein each sub-interface is associated with a particular network service provider; and
assigning one or more sub-networks to one or more of the sub-interfaces.

13. The method of claim 9 wherein the step of defining to an address assignor one or more ranges of network addresses comprises proportionally associating a range of network addresses to routing means based on a previous distribution of addresses associated with the routing means.

14. The method of claim 9 wherein the step of performing the specified action comprises the steps of:
defining to an address assignor one or more ranges of network addresses wherein the ranges include addresses that are assignable by the address assignor to devices on a network and wherein the ranges of network addresses are newly defined to the address assignor;

configuring at least one routing means on the network to support routing transmissions to at least one of the network addresses;

specifying to the address assignor one or more sub-networks to which any of the one or more defined address ranges are assignable;

reserving a network address for a particular router means associated with a particular sub-network from the one or more sub-networks, wherein the reserved network address is from a defined address range assigned to the particular sub-network;

specifying to the address assignor a particular default routing means for a particular device on the network that is assigned a network address from any of the one or more defined address ranges; and directing the address assignor to discontinue renewing and distributing network addresses from one or more old ranges of network addresses other than those newly defined to the address assignor.

15. The method of claim 14, further comprising, upon passing of one address lease cycle associated with the address assignor and each network device administered by the address assignor, the steps of:

removing from the address assignor the capability to assign to network devices the addresses from the one or more old ranges, and removing from routing means the capability to support routing transmissions to the network addresses from the one or more old ranges.

16. The method of claim 14 wherein the step of configuring routing means comprises the steps of:

creating one or more sub-interfaces on a physical interface of the routing means, wherein each sub-interface is associated with a particular network service provider; and assigning one or more sub-networks to one or more of the sub-interfaces.

17. The method of claim 9 wherein the step of performing the specified action comprises the steps of:

directing an address assignor to discontinue renewing and distributing network addresses from one or more ranges of network addresses; and upon passing of one address lease cycle associated with the address assignor and each network device administered by the address assignor, removing from the address assignor the capability to assign to network devices the addresses from the one or more ranges, and removing from one or more routing means the capability to support routing transmissions to the network addresses from the one or more ranges.

18. A machine-implemented method for automated management of network addresses comprising the steps of:

receiving condition information that describes a network address utilization state for triggering an action;

receiving action information describing an action associated with the condition;

determining an address utilization state of a network, wherein the address utilization state is based on:

a percentage of a certain address space allocated to a network service provider that is in use by at least one of a physical interface and a sub-interface of network access devices that couple subscribers of the network service provider to the network, over a total address space available to the network service provider;

a percentage of address space that is in use at a physical interface over the total address space allocated by the owner; or a percentage of address space in use at a physical interface over the amount of address space allocated to that interface and to a network service provider; and wherein the determining comprises:

collecting the address utilization data from at least one Dynamic Host Configuration Protocol (DHCP) server of the network; or polling a broadband terminal directly to obtain the address utilization data; and performing a specified action on addresses from the certain address space in response to the determining the address utilization state;

wherein the steps are performed at one or more facilities from a hierarchical group of facilities described, in increasing levels, as a cable head-end facility, a cable regional data center facility, and a cable national data center facility; and wherein the steps are performed at one of the one or more facilities to manage network addresses of facilities on the same hierarchical level; and wherein the performing the specified action comprises:

defining to an address assignor one or more ranges of network addresses wherein the ranges include addresses that are assignable to devices on a network; and configuring at least one routing means on the network to support routing transmissions to at least one of the network addresses;

specifying to the address assignor one or more sub-networks to which any of the one or more defined network address ranges are assignable;

reserving a network address for a particular router means associated with a particular sub-network from the one or more sub-networks, wherein the reserved network address is from a defined address range assigned to the particular sub-network; and specifying to the address assignor a particular default routing means for a particular device on the network that is assigned a network address from any of the one or more defined address ranges.

19. The method of claim 18 wherein the steps are performed at one of the one or more facilities to manage network addresses of facilities on a lower hierarchical level.

20. A machine-implemented method for automated management of network addresses comprising the steps of:

receiving condition information describing a network address utilization state for triggering an action;

receiving action information describing an action associated with the condition;

determining an address utilization state of a network, wherein the address utilization state is based on:

a percentage of a certain address space allocated to a network service provider that is in use by at least one of a physical interface and a sub-interface of network access devices that couple subscribers of the network service provider to the network, over a total address space available to the network service provider;

a percentage of address space that is in use at a physical interface over the total address space allocated by the owner; or a percentage of address space in use at a physical interface over the amount of address space allocated to that interface and to a network service provider; and wherein the determining comprises:

collecting the address utilization data from at least one Dynamic Host Configuration Protocol (DHCP) server of the network; or polling a broadband terminal directly to obtain the address utilization data wherein the available network addresses are substantially utilized and responsively performing a specified action on addresses from the certain address space in response to the determining the address utilization state wherein at least one attribute of the certain address space is changeable with the specified action, wherein the responsively performing comprises the steps of:

defining to an address assignor one or more ranges of network addresses wherein the ranges include addresses that are assignable to devices on the network;

configuring at least one routing means on the network to support routing transmissions to at least one of the network addresses;

specifying to the address assignor one or more sub-networks to which any of the one or more defined network address ranges are assignable;

reserving a network address for a particular router means associated with a particular sub-network from the one or more sub-networks, wherein the reserved network address is from a defined address range assigned to the particular sub-network; and specifying to the address assignor a particular default routing means for a particular device on the network that is assigned a network address from any of the one or more defined address ranges.

21. A computer-readable medium carrying one or more sequences of instructions for managing network addresses, wherein execution of the one or more sequences of instructions by one or more processors causes the one or more processors to perform steps of:

determining an address utilization state of a network, wherein the address utilization state is based on:

a percentage of a certain address space allocated to a network service provider that is in use by at least one of a physical interface and a sub-interface of network access devices that couple subscribers of the network service provider to the network, over a total address space available to the network service provider;

a percentage of address space that is in use at a physical interface over the total address space allocated by the owner; or a percentage of address space in use at a physical interface over the amount of address space allocated to that interface and to a network service provider; and wherein the determining comprises:

collecting the address utilization data from at least one Dynamic Host Configuration Protocol (DHCP) server of the network; or polling a broadband terminal directly to obtain the address utilization data therefrom; and performing a specified action on addresses from the certain address space in response to the determining the address utilization state;

wherein the performing the specified action comprises:

defining to an address assignor one or more ranges of network addresses wherein the ranges include addresses that are assignable to devices on a network; and configuring at least one routing means on the network to support routing transmissions to at least one of the network addresses;

specifying to the address assignor one or more sub-networks to which any of the one or more defined network address ranges are assignable;

reserving a network address for a particular router means associated with a particular sub-network from the one or more sub-networks, wherein the reserved network address is from a defined address range assigned to the particular sub-network; and specifying to the address assignor a particular default routing means for a particular device on the network that is assigned a network address from any of the one or more defined address ranges.

22. The computer-readable medium of claim 21 wherein execution of the one or more sequences of instructions by one or more processors causes the one or more processors to perform the specified action by causing the one or more processors to perform a step of:

allocating specific addresses to a particular network, the addresses being assignable to devices on the particular network.

23. The computer-readable medium of claim 21 wherein execution of the one or more sequences of instructions by one or more processors causes the one or more processors to perform the specified action by causing the one or more processors to perform a step of:

reconfiguring addresses on a particular network including more than one address block, resulting in decreasing the number of address blocks associated with the particular network.

24. The computer-readable medium of claim 21 wherein execution of the one or more sequences of instructions by one or more processors causes the one or more processors to perform the specified action by causing the one or more processors to perform a step of:

reclaiming specific addresses from a particular network, resulting in making the addresses unassignable to devices on the particular network.

25. The computer-readable medium of claim 21 wherein execution of the one or more sequences of instructions by one or more processors causes the one or more processors to perform the specified action by causing the one or more processors to perform a step of:

notifying a network access manager that an address utilization condition is met and awaiting a response from the network access manager as to further action to perform.

26. The computer-readable medium of claim 21 wherein execution of the one or more sequences of instructions by one or more processors causes the one or more processors to perform the step of determining a state of address utilization by causing the one or more processors to perform a step of:

querying a Dynamic Host Configuration Protocol (DHCP) server application.

27. A computer system comprising:

a network interface; and one or more processors connected to the network interface, the one or more processors configured for:

receiving a description of a condition describing a network address utilization state for triggering an action;

determining an address utilization state of a network, wherein the address utilization state is based on:

a percentage of a certain address space allocated to a network service provider that is in use by at least one of a physical interface and a sub-interface of network access devices that couple subscribers of the network service provider to the network, over a total address space available to the network service provider;

a percentage of address space that is in use at a physical interface over the total address space allocated by the owner; or a percentage of address space in use at a physical interface over the amount of address space allocated to that interface and to a network service provider; and wherein the determining comprises:

collecting the address utilization data from at least one Dynamic Host Configuration Protocol (DHCP) server of the network; or polling a broadband terminal directly to obtain the address utilization data therefrom; and performing a specified action on addresses from the certain address space in response to the determining the address utilization state;

wherein the performing the specified action comprises:

defining to an address assignor one or more ranges of network addresses wherein the ranges include addresses that are assignable to devices on a network; and configuring at least one routing means on the network to support routing transmissions to at least one of the network addresses;

specifying to the address assignor one or more sub-networks to which any of the one or more defined network address ranges are assignable;

reserving a network address for a particular router means associated with a particular sub-network from the one or more sub-networks, wherein the reserved network address is from a defined address range assigned to the particular sub-network; and specifying to the address assignor a particular default routing means for a particular device on the network that is assigned a network address from any of the one or more defined address ranges.

28. The computer system as recited in claim 27 wherein the one or more processors is further configured for:

comparing the address utilization state with condition information; upon the address utilization state meeting the condition, completing the step of performing a specified action wherein the specified action is associated with the condition; and upon the address utilization state not meeting the condition, completing the step of performing a specified action wherein the specified action is a null action.

29. The computer system as recited in claim 27 wherein the action comprises allocating a group of specific addresses to a particular network, for assigning the addresses to devices on the particular network.

30. The computer system as recited in claim 27 wherein the action comprises reconfiguring addresses on a particular network including more than one address block, resulting in decreasing the number of address blocks associated with the particular network.

31. The computer system as recited in claim 30 wherein the addresses are reconfigured based on an existing address block.

32. The computer system as recited in claim 27 wherein the action comprises reclaiming specific addresses from a particular network, resulting in making the addresses unassignable to devices on the particular network.

33. The computer system as recited in claim 27 wherein the action comprises notifying a network access manager that an address utilization condition is met and awaiting a response from the network access manager as to further action to perform.

34. The computer system as recited in claim 27 wherein determining the state of address utilization comprises querying a Dynamic Host Configuration Protocol (DHCP) server.

35. An apparatus for managing network addresses, the apparatus comprising:

means for receiving a description of a condition describing a network address utilization state for triggering an action;

means for determining an address utilization state of a network, wherein the address utilization state is based on:

a percentage of a certain address space allocated to a network service provider that is in use by at least one of a physical interface and a sub-interface of network access devices that couple subscribers of the network service provider to the network, over a total address space available to the network service provider;

a percentage of address space that is in use at a physical interface over the total address space allocated by the owner; or a percentage of address space in use at a physical interface over the amount of address space allocated to that interface and to a network service provider; and wherein the determining means comprise:

means for collecting the address utilization data from at least one Dynamic Host Configuration Protocol (DHCP) server of the network; or means for polling a broadband terminal directly to obtain the address utilization data therefrom; and means for performing a specified action on addresses from the certain address space in response to the determining the address utilization state;

wherein the performing means comprise:

means for defining to an address assignor one or more ranges of network addresses wherein the ranges include addresses that are assignable to devices on a network; and means for configuring at least one routing means on the network to support routing transmissions to at least one of the network addresses;

means for specifying to the address assignor one or more sub-networks to which any of the one or more defined network address ranges are assignable;

means for reserving a network address for a particular router means associated with a particular sub-network from the one or more sub-networks, wherein the reserved network address is from a defined address range assigned to the particular sub-network; and means for specifying to the address assignor a particular default routing means for a particular device on the network that is assigned a network address from any of the one or more defined address ranges.

36. A computer system comprising:

a network interface; and one or more processors connected to the network interface, the one or more processors configured for:

receiving condition information describing a network address utilization state for triggering an action;

receiving action information describing an action associated with the condition;

determining an address utilization state of a network, wherein the address utilization state is based on:

a percentage of a certain address space allocated to a network service provider that is in use by at least one of a physical interface and a sub-interface of network access devices that couple subscribers of the network service provider to the network, over a total address space available to the network service provider;

a percentage of address space that is in use at a physical interface over the total address space allocated by the owner; or a percentage of address space in use at a physical interface over the amount of address space allocated to that interface and to a network service provider; and wherein the determining comprises:
collecting the address utilization data from at least one Dynamic Host Configuration Protocol (DHCP) server of the network; or
polling a broadband terminal directly to obtain the address utilization data therefrom; and wherein the available network addresses are substantially utilized and responsively performing a specified action on addresses from the certain address space in response to the determining the address utilization state wherein at least one attribute of the certain address space is changeable with the specified action and comprises the steps of:

defining to an address assignor one or more ranges of network addresses wherein the ranges include addresses that are assignable to devices on the network;

configuring at least one routing means on the network to support routing transmissions to at least one of the network addresses;

specifying to the address assignor one or more sub-networks to which any of the one or more defined network address ranges are assignable;

reserving a network address for a particular router means associated with a particular sub-network from the one or more sub-networks, wherein the reserved network address is from a defined address range assigned to the particular sub-network; and specifying to the address assignor a particular default routing means for a particular device on the network that is assigned a network address from any of the one or more defined address ranges.

37. An apparatus for automated management of network addresses, the apparatus comprising:

means for receiving condition information describing a network address utilization state for triggering an action;

means for receiving action information describing an action associated with the condition;

means for determining an address utilization state of a network, wherein the address utilization state is based on:

a percentage of a certain address space allocated to a network service provider that is in use by at least one of a physical interface and a sub-interface of network access devices that couple subscribers of the network service provider to the network, over a total address space available to the network service provider;

a percentage of address space that is in use at a physical interface over the total address space allocated by the owner; or a percentage of address space in use at a physical interface over the amount of address space allocated to that interface and to a network service provider;

wherein the determining means comprise:
means for collecting the address utilization data from at least one Dynamic Host Configuration Protocol (DHCP) server of the network; or means for polling a broadband terminal directly to obtain the address utilization data therefrom; and wherein, responsive to a function of the determining means, an action performing means functions to perform a specified action on addresses from the certain address space wherein the action performing means comprise:
means for defining to an address assignor one or more ranges of network addresses wherein the ranges include addresses that are assignable to devices on the network;

means for configuring at least one routing means on the network to support routing transmissions to at least one of the network addresses;

means for specifying to the address assignor one or more sub-networks to which any of the one or more defined network address ranges are assignable;

means for reserving a network address for a particular router means associated with a particular sub-network from the one or more sub-networks, wherein the reserved network address is from a defined address range assigned to the particular sub-network; and means for specifying to the address assignor a particular default routing means for a particular device on the network that is assigned a network address from any of the one or more defined address ranges.

38. The apparatus as recited in claim 37, further comprising:

means for comparing the address utilization state with condition information;

means for, upon the address utilization state meeting the condition, completing the step of performing a specified action wherein the specified action is associated with the condition; and means for, upon the address utilization state not meeting the condition, completing the step of performing a specified action wherein the specified action is a null action.

39. The apparatus as recited in claim 37 wherein the action comprises allocating a group of specific addresses to a particular network, for assigning the addresses to devices on the particular network.

40. The apparatus as recited in claim 37 wherein the action comprises reconfiguring addresses on a particular network including more than one address block, resulting in decreasing the number of address blocks associated with the particular network.

41. The apparatus as recited in claim 40 wherein the addresses are reconfigured based on an existing address block.

42. The apparatus as recited in claim 37 wherein the action comprises reclaiming specific addresses from a particular network, resulting in making the addresses unassignable to devices on the particular network.

43. The apparatus as recited in claim 37 wherein the action comprises notifying a network access manager that an address utilization condition is met and awaiting a response from the network access manager as to further action to perform.

44. The apparatus as recited in claim 37 wherein the determining means comprise means for querying a Dynamic Host Configuration Protocol (DHCP) server.

* * * * *

UNITED STATES PATENT AND TRADEMARK OFFICE
CERTIFICATE OF CORRECTION

| | |
|---|---|
| PATENT NO. | : 7,185,079 B1 |
| APPLICATION NO. | : 09/925227 |
| DATED | : February 27, 2007 |
| INVENTOR(S) | : David K. Bainbridge et al. |

Page 1 of 1

It is certified that error appears in the above-identified patent and that said Letters Patent is hereby corrected as shown below:

Claim 1, column 15, line 1, delete "at last one of"

Claim 9, column 16, line 4, delete "used by"

Signed and Sealed this

Ninth Day of September, 2008

JON W. DUDAS
*Director of the United States Patent and Trademark Office*